United States Patent
Scurry et al.

(10) Patent No.: US 11,496,898 B2
(45) Date of Patent: Nov. 8, 2022

(54) WIRELESS NETWORK AUTHENTICATION USING ISOLATED SECURITY KEY

(71) Applicant: Sammy David Enterprises, LLC, Austin, TX (US)

(72) Inventors: Christopher Michael Scurry, Austin, TX (US); Roman-Wark Belachew Scurry, Austin, TX (US)

(*) Notice: Subject to any disclaimer, the term of this patent is extended or adjusted under 35 U.S.C. 154(b) by 293 days.

(21) Appl. No.: 16/890,200

(22) Filed: Jun. 2, 2020

(65) Prior Publication Data

US 2021/0377730 A1    Dec. 2, 2021

(51) Int. Cl.
| | |
|---|---|
| H04L 29/06 | (2006.01) |
| H04W 12/06 | (2021.01) |
| H04W 40/24 | (2009.01) |
| H04W 12/03 | (2021.01) |
| H04W 12/041 | (2021.01) |
| H04W 84/12 | (2009.01) |
| H04W 84/18 | (2009.01) |

(52) U.S. Cl.
CPC ........... *H04W 12/06* (2013.01); *H04W 12/03* (2021.01); *H04W 12/041* (2021.01); *H04W 40/244* (2013.01); *H04W 84/12* (2013.01); *H04W 84/18* (2013.01)

(58) Field of Classification Search
CPC ... H04W 12/03; H04W 12/06; H04W 12/041; H04W 40/244; H04W 84/12; H04L 63/0884; H04L 63/0876; H04L 63/10
See application file for complete search history.

(56) References Cited

U.S. PATENT DOCUMENTS

| | | | | |
|---|---|---|---|---|
| 2006/0171388 | A1* | 8/2006 | Ikeda | H04W 8/005 370/389 |
| 2015/0222709 | A1* | 8/2015 | Thielen | H04L 69/18 709/227 |
| 2017/0134182 | A1* | 5/2017 | Davis | H04Q 9/00 |
| 2018/0020353 | A1* | 1/2018 | Bhandaru | H04L 9/088 |
| 2021/0086901 | A1* | 3/2021 | Miller | H04N 21/2146 |

* cited by examiner

*Primary Examiner* — Joseph P Hirl
*Assistant Examiner* — Chi D Nguy
(74) *Attorney, Agent, or Firm* — The Scurry Law Firm, PLLC; Christopher M. Scurry (57) ABSTRACT

A method includes generating, at a first station, a security key that is usable for authentication with an access point associated with a wireless network. The method includes switching from an infrastructure mode to an ad hoc communication mode, and while in the ad hoc communication mode, broadcasting a beacon frame and receiving a request, from a second station, to join the wireless network. The method includes determining that the second station is an approved device and sending a first authentication request to the access point on behalf of the second station. The method includes receiving a first authentication response, including challenge text, from the access point. The method includes encrypting the challenge text based on the security key and sending the encrypted challenge text as part of a second authentication request to the access point to authenticate the second station with the access point.

20 Claims, 7 Drawing Sheets

WIRELESS NETWORK AUTHENTICATION USING ISOLATED SECURITY KEY

I. FIELD

The present disclosure is generally related to wireless network authentication.

II. BACKGROUND

A mobile device can authenticate with an access point to become part of a wireless network. Typically, the mobile device uses a security key to authenticate with the access point. As a non-limiting example, in a home setting, a user can enter a security key (e.g., a password) into the user's mobile device to authenticate the user's mobile device with an access point of the user's home wireless network.

If a guest enters the user's home and wishes to access the user's home wireless network with a guest mobile device, the user will typically have to give the guest the security key so that the guest can enter the security key into the guest mobile device. However, once the security key is shared, the likelihood that additional mobile devices will access the user's home wireless network, with or without the user's permission, increases. As a result, the user's home wireless network can become susceptible to network congestion and security threats.

III. SUMMARY

According to a particular implementation of the techniques disclosed herein, a method of station authentication includes generating, at a first station, a security key that is usable for authentication with an access point associated with a wireless network during an infrastructure mode. The method also includes switching from the infrastructure mode to an ad hoc communication mode for a particular time period. While in the ad hoc communication mode for the particular time period, the method includes broadcasting a beacon frame and receiving a request, from a second station, to join the wireless network in response to broadcasting the beacon frame. The beacon frame includes network information associated with the wireless network, and the request includes device information associated with the second station. The method also includes determining, based on the device information, whether the second station is an approved device. The method further includes sending a first authentication request to the access point on behalf of the second station in response to a determination that the second station is an approved device. The first authentication request includes the device information associated with the second station. The method also includes receiving a first authentication response from the access point in response to sending the first authentication request. The first authentication response includes challenge text. The method further includes encrypting the challenge text based on the security key to generate encrypted challenge text. The security key is isolated from the second station. The method also includes sending the encrypted challenge text as part of a second authentication request to the access point to authenticate the second station with the access point.

According to another implementation of the techniques disclosed herein, a station includes a memory and a processor coupled to the memory. The processor is configured to generate a security key that is usable for authentication with an access point associated with a wireless network during an infrastructure mode. The processor is also configured to initiate a switch from the infrastructure mode to an ad hoc communication mode for a particular time period. The station also includes a transceiver coupled to the processor. The transceiver is configured to, while in the ad hoc communication mode for the particular time period, broadcast a beacon frame and receive a request, from a second station, to join the wireless network in response to broadcasting the beacon frame. The beacon frame includes network information associated with the wireless network, and the request includes device information associated with the second station. The processor is further configured to determine, based on the device information, whether the second station is an approved device. The transceiver is further configured to send a first authentication request to the access point on behalf of the second station in response to a determination that the second station is an approved device. The first authentication request includes the device information associated with the second station. The transceiver is also configured to receive a first authentication response from the access point in response to sending the first authentication request. The first authentication response includes challenge text. The processor is further configured to encrypt the challenge text based on the security key to generate encrypted challenge text. The security key is isolated from the second station. The transceiver is further configured to send the encrypted challenge text as part of a second authentication request to the access point to authenticate the second station with the access point.

According to another implementation of the techniques disclosed herein, a non-transitory computer-readable medium includes instructions for station authentication. The instructions, when executed by a processor in a station, cause the processor to perform operations including generating a security key that is usable for authentication with an access point associated with a wireless network during an infrastructure mode. The operations also include initiating a switch from the infrastructure mode to an ad hoc communication mode for a particular time period. While in the ad hoc communication mode for the particular time period, the operations include initiating a broadcast of a beacon frame and processing a received request, from a second station, to join the wireless network in response to broadcasting the beacon frame. The beacon frame includes network information associated with the wireless network, and the request includes device information associated with the second station. The operations also include determining, based on the device information, whether the second station is an approved device. The operations further include initiating transmission of a first authentication request to the access point on behalf of the second station in response to a determination that the second station is an approved device. The first authentication request includes the device information associated with the second station. The operations also include processing a received first authentication response from the access point in response to sending the first authentication request. The first authentication response includes challenge text. The operations further include encrypting the challenge text based on the security key to generate encrypted challenge text. The security key is isolated from the second station. The operations also include initiating transmission of the encrypted challenge text as part of a second authentication request to the access point to authenticate the second station with the access point.

One advantage of the above-described implementations is an ability to permit access to a wireless network without having to disclose a security key for the wireless network. For example, a station can use the security key to authenticate other approved stations with an access point of the wireless network without disclosing the security key. Other implementations, advantages, and features of the present disclosure will become apparent after review of the entire application, including the following sections: Brief Description of the Drawings, Detailed Description, and the Claims.

V. DETAILED DESCRIPTION

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining", "calculating", "detecting", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

Figure 1:
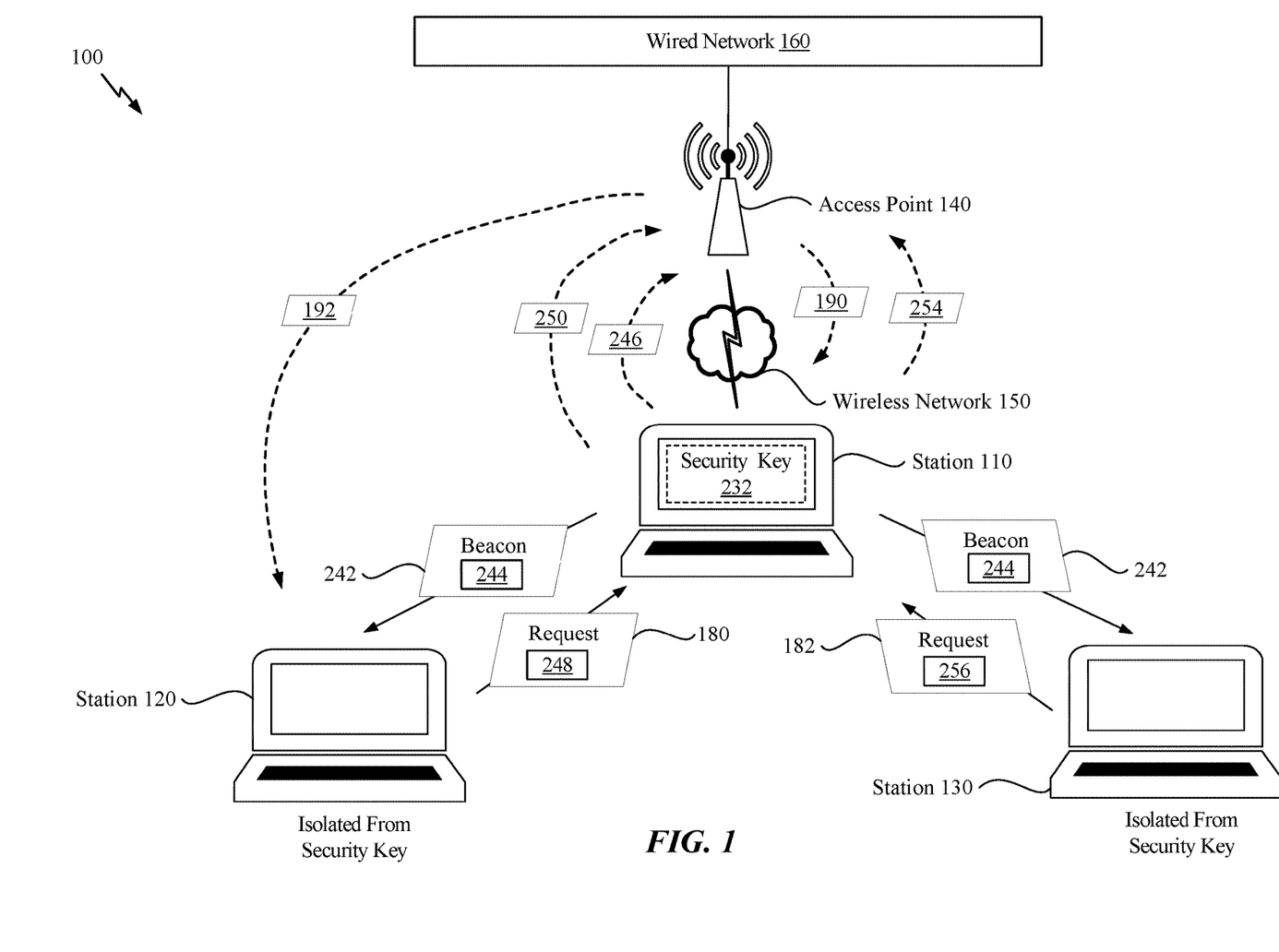
FIG. 1 is diagram of a system that is operable to authenticate wireless communication stations with an access point using an isolated security key.

Referring to FIG. 1, a system 100 that is operable to authenticate wireless communication stations with an access point using an isolated security key is shown. The system 100 includes a station 110, a station 120, a station 130, and an access point 140. Although illustrated as laptop computers, in different implementations, one or more of the stations 110, 120, 130 may include a headset, a smart watch, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as illustrative, non-limiting examples.

The access point 140 is a networking hardware device that enables stations to connect to a wired network 160. For example, the access point 140 establishes a wireless network 150. Stations within the wireless network 150 can communicate with the wired network 160 through the access point 140. According to one implementation, the wireless network 150 includes an Institute of Electrical and Electronics Engineers (IEEE) 802.11 wireless network. The wireless network 150 can be a wireless local area network (WLAN).

To join the wireless network 150, a station must use a security key 232 to authenticate with the access point 140. The access point 140 sends an authentication message at the end of the authentication process to indicate that a station receiving the authentication message has been authenticated. After authentication, the station can associated with the wireless network 150 using conventional techniques. As illustrated in FIG. 1, the station 110 has access to the security key 232. As a result, the station 110 is included in the wireless network 150 and can communicate with the wired network 160 through the access point 140. The stations 120, 130 are isolated from the security key 232. That is, the security key 232 is not readily available to the stations 120, 130 to use for authentication with the access point 140.

The techniques described herein enable the station 110 to selectively authenticate the other stations 120, 130 with the access point 140 using the security key 232 upon a determination that the stations 120, 130 are approved devices. As described below, it should be appreciated that the station 110 can perform the authentication on behalf of the other stations 120, 130 without sharing the security key 232 with the other stations 120, 130. As a result of not sharing the security key 232, it will become increasingly difficult for unauthorized parties to access the wireless network 150. Thus, the wireless network 150 will be less susceptible to network congestion and security threats.

Figure 2:
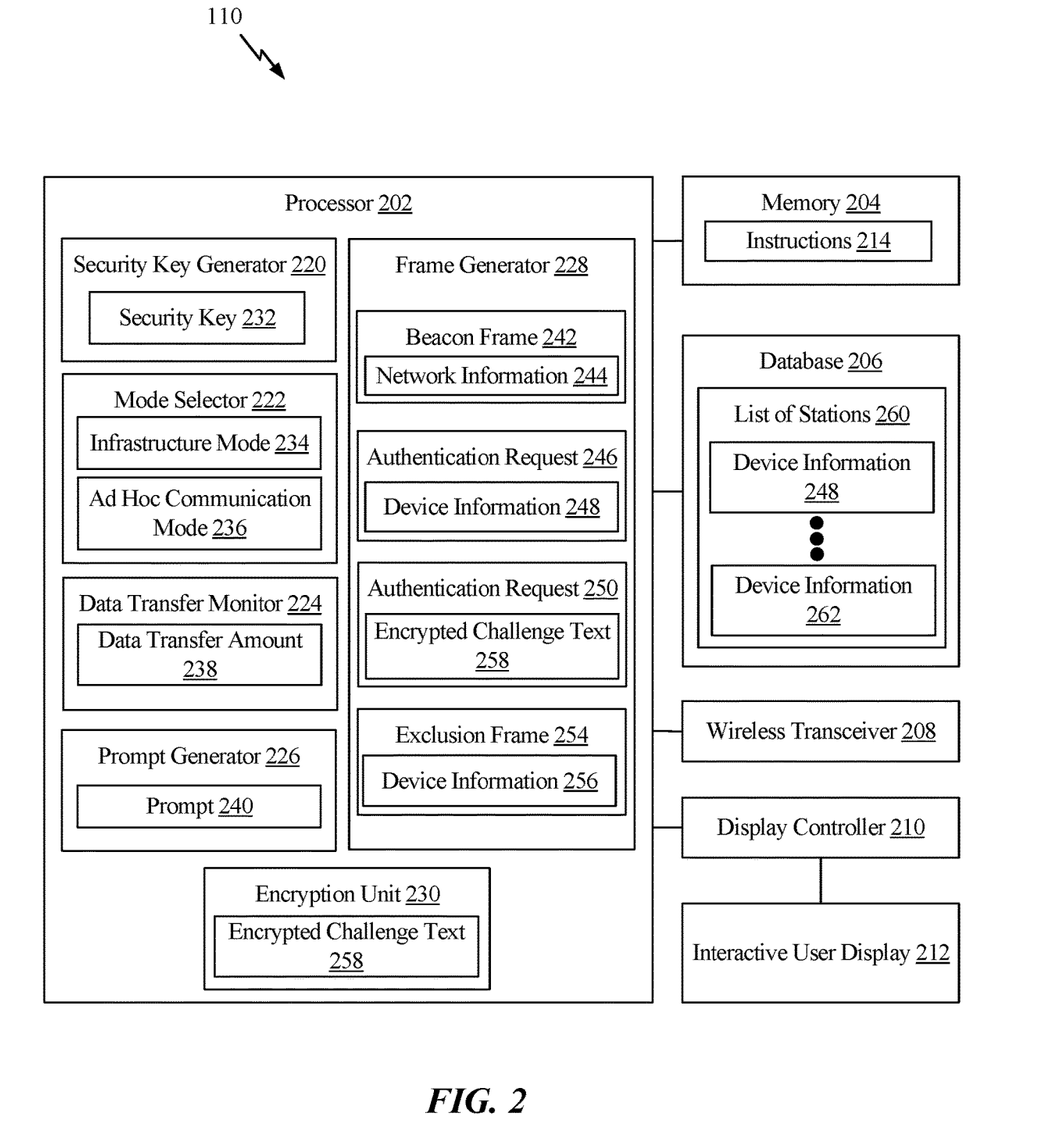
FIG. 2 is a diagram of a station that is operable to authenticate other wireless communication stations with an access point.

Referring to FIG. 2, a diagram of the station 110 having access to the security key 232 is shown. The station 110 includes a processor 202. According to some implementations, the processor 202 is a multi-core processor. According to other implementations, the processor 202 is a single-core processor. The processor 202 can be a central processing unit (CPU), a digital signal processor (DSP), or another type of processor. The station 110 also includes a memory 204 coupled to the processor 202, a database 206 coupled to the processor 202, a wireless transceiver 208 coupled to the processor 202, and a display controller 210 coupled to the processor 202. An interactive user display 212 is coupled to the display controller 210.

The memory 204 can be a non-transitory computer-readable medium that stores instructions 214. The instructions 214 are executable by the processor 202 to perform the operations described herein. According to one implementation, the instructions 214 are executable by the processor 202 to cause the processor 202 to perform or initiate steps in the method 700 of FIG. 7. The memory 204 can be random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM).

The processor 202 includes a security key generator 220, a mode selector 222, a data transfer monitor 224, a prompt generator 226, a frame generator 228, and an encryption unit 230. According to some implementations, one or more of the processor components 220, 222, 224, 226, 228, 230 can correspond to software (e.g., instructions 214) executable by the processor 202. According to other implementations, one or more the processor components 220, 222, 224, 226, 228, 230 can correspond to dedicated circuitry (e.g., application-specific integrated circuits (ASICs) or field programmable gate arrays (FPGAs)) integrated into the processor 202. Additionally, one or more of the processor components 220, 222, 224, 226, 228, 230 can be integrated with another processor component.

The security key generator 220 is configured to generate the security key 232 used to authenticate the station 110 with the access point 140. According to one implementation, the security key 232 can have an ASCII form such that it includes a sequence of letters, decimal numbers, or a combination thereof. According to another implementation, the security key 232 can have a Hex form such that it includes a sequence of hexadecimal numbers. The security key 232 is usable by the station 110 to authenticate with the access point 140. As a non-limiting example, during a four-way handshake, the security key 232 is used by the station 110 during an encryption process to grant the station 110 access into the wireless network 150.

As described above, with respect to FIG. 1, the station 110 is configured to selectively authenticate the other stations 120, 130 with the access point 140 using the security key 232 upon a determination that the stations 120, 130 are approved devices. To begin the authentication, the processor 202 is configured to establish an ad hoc communication network (e.g., a peer-to-peer network) with the other stations 120, 130 using a service set identifier (SSID) of the ad hoc communication network. After the ad hoc communication network is established such that the station 110 can directly exchange messages with the other stations 110, 120 based on peer-to-peer transmissions, the mode selector 222 switches the station 110 from an infrastructure mode 234 to an ad hoc communication mode 236 for a particular time period. According to some implementations, the particular time period can be equal to one time unit, two time units, three time units, or four time units, where each time unit is equal to 1024 microseconds. Although the above examples of the particular time period are not intended to be limiting, it should be appreciated that a shorter particular time period is preferable to reduce the amount of time that the station 110 is not operating in the infrastructure mode 234. While operating in the infrastructure mode 234, the wireless transceiver 208 can communicate messages with the access point 140. However, while operating in the ad hoc communication mode 236, the wireless transceiver 208 can directly communicate messages with the stations 120, 130 using the ad hoc communication network.

According to some implementations, the data transfer monitor 224 is configured to monitor a data transfer amount 238 (e.g., an amount of data transfer) associated with the wireless network 150 while operating in the infrastructure mode 234. To reduce network interference when the data transfer amount 238 is relatively high, the mode selector 222 can be configured to switch from the infrastructure mode 234 to the ad hoc communication mode 236 in response to a determination that the data transfer amount 238 fails to satisfy a data transfer threshold.

According to other implementations, the mode selector 222 is configured to periodically switch from the infrastructure mode 234 to the ad hoc communication mode 236. As non-limiting examples, the mode selector 222 can switch from the infrastructure mode 234 to the ad hoc communication mode 236 every twenty time units, every twenty-five time units, every thirty time units, every fifty time units, etc. If the mode selector 222 performs periodic switching, according to some implementations, the period can be determined based on a number of stations that have historically authenticated with the access point 140. For example, if a relatively large number of stations have been authenticated with the access point 140 in the past, the period can be relatively small (e.g., twenty time units) because it is more likely that stations are trying to access the wireless network 150. However, if a relatively small number of stations have been authenticated with the access point 140 in the past, the period can be relatively large (e.g., fifty time units) because it is not likely that stations are trying to access the wireless network 150. Thus, a frequency at which the mode selector 222 initiates a periodic switch from the infrastructure mode 234 to the ad hoc communication mode 236 can be dependent on a historical number of stations that have been authenticated with the access point 140. According to yet another implementation, switching from the infrastructure mode 234 to the ad hoc communication mode 236 is initiated by a user request.

While operating in the ad hoc communication mode 236 during the particular time period, the frame generator 228 is configured to generate a beacon frame 242, and the wireless transceiver 208 is configured to broadcast the beacon frame 242 to stations in the ad hoc communication network (e.g., the stations 120, 130). The beacon frame 242 includes network information 244 associated with the wireless network 150. According to some implementations, the network information 244 includes a SSID of the wireless network 150, capability information of the access point 140, etc. Although described as a "broadcast," it should be understood that term "broadcast" as used herein can also mean a multicast or unicast.

According to some implementations, the station 110 can receive an "original" beacon frame (having the network information 244) from the access point 140 while operating in the infrastructure mode 234. The frame generator 228 can generate the beacon frame 242 using the network information 244 from the original beacon frame broadcast from the access point 140. For example, after receiving the original beacon frame from the access point 140, the frame generator 228 can populate the relative fields in the beacon frame 142 with the SSID of the wireless network 150, the capability information of the access point 140, etc.

Additionally, while operating in the ad hoc communication mode 236 during the particular time period, the wireless transceiver 208 can receive a request 180, from the station 120, to join the wireless network 150 in response to broadcasting the beacon frame 242, as shown in FIG. 1. The request 180 includes device information 248 associated with the station 120. The device information 248 can include an address of the station 120 (e.g., a media access control (MAC) address of the station 120), capability information of the station 120, etc. Although the request 180 is described as being received during the particular time period, in some implementations, the request 180 can be received during a subsequent switch from the infrastructure mode 234 to the ad hoc communication mode 236.

The processor 202 is configured to determine, based on the device information 248 associated with the station 120, whether the station 120 is an approved device. For example, the processor 202 can make a determination of whether to grant the station 120 access to the wireless network 150.

According to one implementation, to determine whether the station 120 is an approved device, the prompt generator 226 can generate a prompt 240 to verify whether the station 120 has permission to join the wireless network 150. The prompt 240 displays information about the station 120 based on the device information 248. The display controller 210 is configured to display the prompt 240 at the interactive user display 212.

Figure 3:
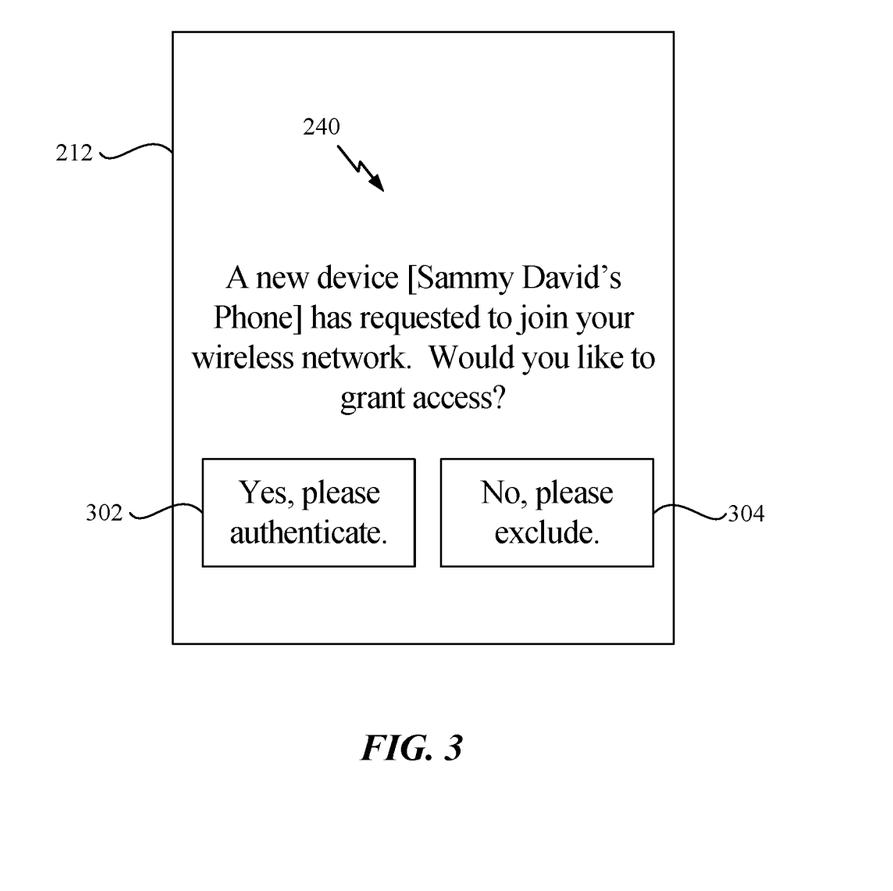
FIG. 3 is a diagram of an interactive user display that display a user prompt.

Referring to FIG. 3, an illustrative example of the prompt 240 on the interactive user display 212 is shown. The prompt 240 inquires whether the station 120 (e.g., "Sammy David's Phone") has permission to join the wireless network 150. According to the illustrative example, the name of the station 120 (e.g., "Sammy David's Phone") in the prompt 240 can be generated based on the device information 248 of the station 120 transmitted in the request 180. The prompt 240 also includes a user-selectable option 302 and a user-selectable option 304. A user response is received by the processor 202 and indicates which user-selectable option 302, 304 was selected. The station 120 is an approved device if the user response indicates that the station 120 has permission to join the wireless network 150 (e.g., if the user-selectable option 302 is selected). The station 120 is not an approved device if the user response indicates that the station 120 does not have permission to join the wireless network 304 (e.g., if the user-selectable option 304 is selected).

Referring back to FIG. 2 and according to another implementation, to determine whether the station 120 is an approved device, the processor 202 is configured to access a list of stations 260 that have previously been granted permission to join the wireless network 150. The list of stations 260 can be stored in the database 206 coupled to the processor 202. In the illustrative example in FIG. 2, the list of stations 260 includes device information 248 of the station 120 and device information 262 for another station (not shown). The processor 202 is configured to compare the device information 248 associated with the station 120 to device information 248, 262 associated with stations in the list of stations 260. The station 120 is an approved device if the device information 248 associated with the station 120 matches device information of a station in the list of stations 260, and the station 120 is not an approved device if the device information associated with the station 120 fails to match device information of a station in the list of stations 260.

For purposes of description, assume that the station 120 is an approved station. That is, according to the user prompt 240 implementation, assume that the user-selectable option 302 is selected. Additionally, or in the alternative, according to the illustrative example in FIG. 2, because the device information 248 associated with the station 120 matches an entry in the list of stations 260, the processor 202 determines that the station 120 is an approved device. It should be understood that other techniques can be used to determine whether the station 120 is an approved device and the examples above are merely for illustrative purposes and should not be construed as limiting.

In response to the determination that the station 120 is an approved device, the frame generator 228 is configured to generate an authentication request 246 that includes the device information 248 associated with the station 120. The wireless transceiver 208 is configured to send the authentication request 246 to the access point 140 on behalf of the station 120 in response to the determination that the station 120 is an approved device. One implementation of generating the authentication request 246 and sending the authentication request 246 on behalf of the station 120 is described with respect to FIG. 4. However, it should be understood that the techniques described with respect to FIG. 4 are merely illustrative and should not be construed as limiting.

Figure 4:
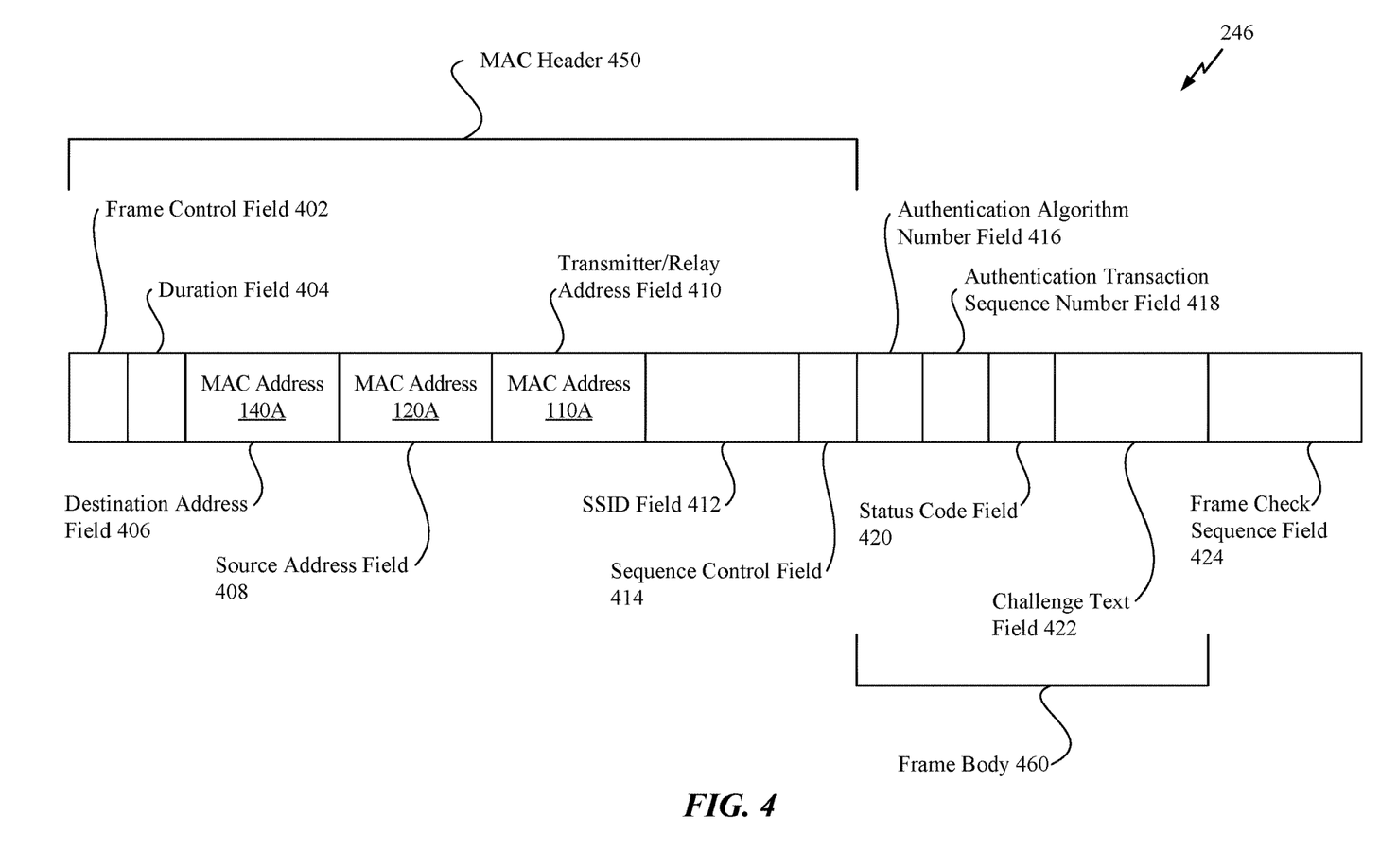
FIG. 4 is a diagram of an authentication request, according to the techniques described herein.

Referring to FIG. 4, an illustrative example of the authentication request 246 is shown. The authentication request 246 includes a MAC header 450 and a frame body 460. The MAC header 450 includes a frame control field 402, a duration field 404, a destination address field 406, a source address field 408, a transmitter address field 410 (e.g., a relay address field), a SSID field 412, and a sequence control field 414. The frame body 460 includes an authentication algorithm number field 416, an authentication transaction sequence number field 418, a status code field 420, and a challenge text field 422. The authentication request 246 also includes a frame check sequence field 424.

For the station 110 to send the authentication request 246 to the access point 140 on behalf of the station 120, the frame generator 228 is configured to populate the destination address field 406 in the authentication request 246 with a MAC address 140A of the access point 140 (e.g., an address of the access point 140). Populating the destination address field 406 with the MAC address 140 of the access point 140 results in transmission of the authentication request 246 to the access point 140. The MAC address 140A of the access point 140 can be determined based on the network information 244.

Additionally, to send the authentication request 246 to the access point 140 on behalf of the station 120, the frame generator 228 is configured to populate the source address field 408 in the authentication request 246 with a MAC address 120A of the station 120. Although the source of the authentication request 246 is the station 110 in reality, populating the source address field 408 with the MAC address 120A of the station 120 indicates to the access point 140 that the station 120 is requesting authentication (as opposed to the station 110). Thus, by populating the source address field 408 with the MAC address 120A of the station 120, the station 110 is sending the authentication request 246 "on behalf" of of the station 120. The MAC address 120A of the station 120 can be determined based on the device information 248.

The frame generator 228 is also configured to populate the transmitter address field 410 with a MAC address 110A of the station 110. The transmitter address field 410 indicates, to the access point 140, an address to send a response frame. By populating the transmitter address field 410 with the MAC address 110A of the station 110, the access point 140 will send the response frame (e.g., an authentication response 190 as shown in FIG. 1) to the station 110, although the authentication request 246 is for the station 120. Thus, populating the transmitter address field 410 with the MAC address 110A of the station 110 promotes the access point 140 to relay the authentication response 190 to the station 120 by way of the station 110. It should be understood that a "relay" from station to station would be performed when switching to the ad hoc communication mode 236 as opposed to during the infrastructure mode 234 where messages are communicated with the access point 140. The other fields 402, 404, 412, 414, 416, 418, 420, 422, 424 can be populated according to a shared key authentication (SKA) method.

Referring back to FIG. 1, the access point 140 sends the authentication response 190 to the station 110 (as opposed to the station 120 that is in the process of authentication) because the transmitter address field 410 (e.g., the relay address field) in the authentication request 246 identified the station 110. Thus, according to one implementation of the techniques described herein, the access point 140 sends response frames to the MAC address identified in the transmitter address field in a request or probe, as opposed to sending response frames to the source address field in the request or probe.

Figure 5:
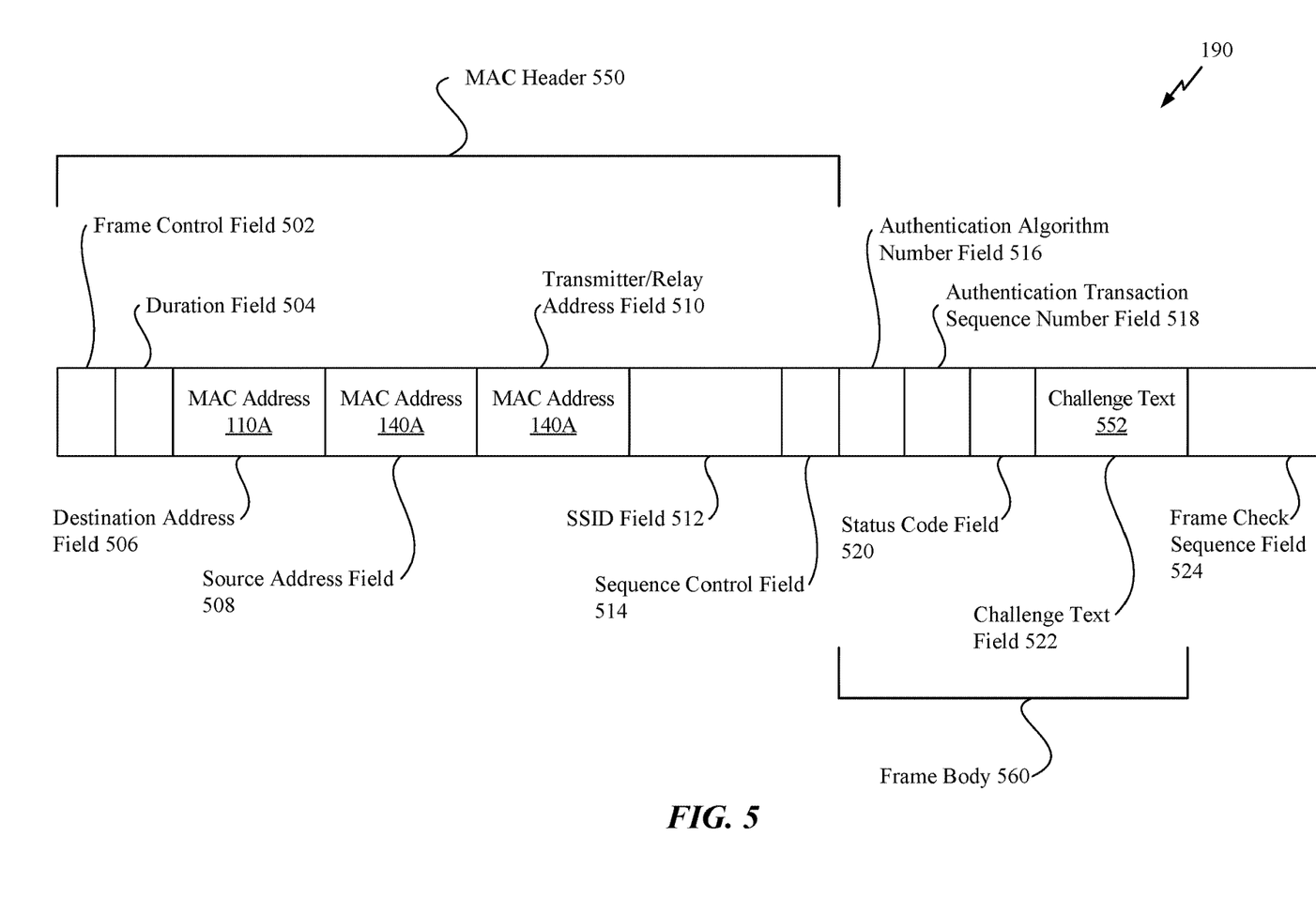
FIG. 5 is diagram of an authentication response, according to the techniques described herein.

Referring to FIG. 5, an illustrative example of the authentication response 190 is shown. The authentication response 190 includes a MAC header 550 and a frame body 560. The MAC header 550 includes a frame control field 502, a duration field 504, a destination address field 506, a source address field 508, a transmitter address field 510 (e.g., a relay address field), a SSID field 512, and a sequence control field 514. The frame body 560 includes an authentication algorithm number field 516, an authentication transaction sequence number field 518, a status code field 520, and a challenge text field 522. The authentication response 190 also includes a frame check sequence field 524.

The access point 140 populates the destination address field 506 with the MAC address 110A of the station 110 in response to the frame generator 228 populating the transmitter address field 410 in the authentication request 246 with the MAC address 110A of the station. Thus, the access point 140 sends the authentication response 190 to the station 110 that sent the authentication request 246. The access point 140 populates the source address field 508 and the transmitter address field 510 with the MAC address 140A of the access point 140.

The access point 140 also populates the challenge text field 522 with challenge text 552. The challenge text 552 is a sequence of characters that are to be encrypted by the receiving station (e.g., the station 110) for verification. For example, the access point 140, in addition to the station 110, has access to the security key 232. The access point 140 sends the challenge text 552 for encryption to a station requesting authentication. If the station has the security key 232, the station encrypts the challenge text 552 using the security key 232 and sends the encrypted version of the challenge text 552 to the access point 140. If the access point 140 decrypts the encrypted version of the challenge text 552 using the security key 232 and gets the challenge text 552, then the access point 140 authenticates the station. However, if the access point 140 decrypts the encrypted version of the challenge text 552 using the security key 232 and does not get the challenge text 552 as sent, then the access point 140 does not authenticate the station. To increase security, the challenge text 552 can change for each authentication process.

As described below, sending the authentication response 190 to the station 110 enables the station 190 to encrypt the challenge text 552 (on behalf of the station 120) using the security key 232 while isolating the station 120 from the security key 232. The other fields 502, 504, 512, 514, 516, 518, 520, 524 can be populated according to a SKA method.

Referring back to FIG. 2, the wireless transceiver 208 is configured to receive the authentication response 190 in response to sending the authentication request 246 to the access point 140. The station 110 is configured to bypass relaying the authentication response 190 to the station 120 after receiving the authentication response 190 to isolate the station 120 from the challenge text 552. That is, the station 110 can bypass switching to the ad hoc communication mode 236 to relay the authentication response 190 to the station 120.

Upon receiving the authentication response 190, the encryption unit 230 is configured to encrypt the challenge text 552 based on the security key 232 to generate encrypted challenge text 258. The frame generator 228 is configured to generate an authentication request 250 after the encrypted challenge text 258 is generated, and the wireless transceiver 208 is configured to send the encrypted challenge text 258 as part of the authentication request 250 to the access point 140 to authenticate the station 120 with the access point 140.

Figure 6:
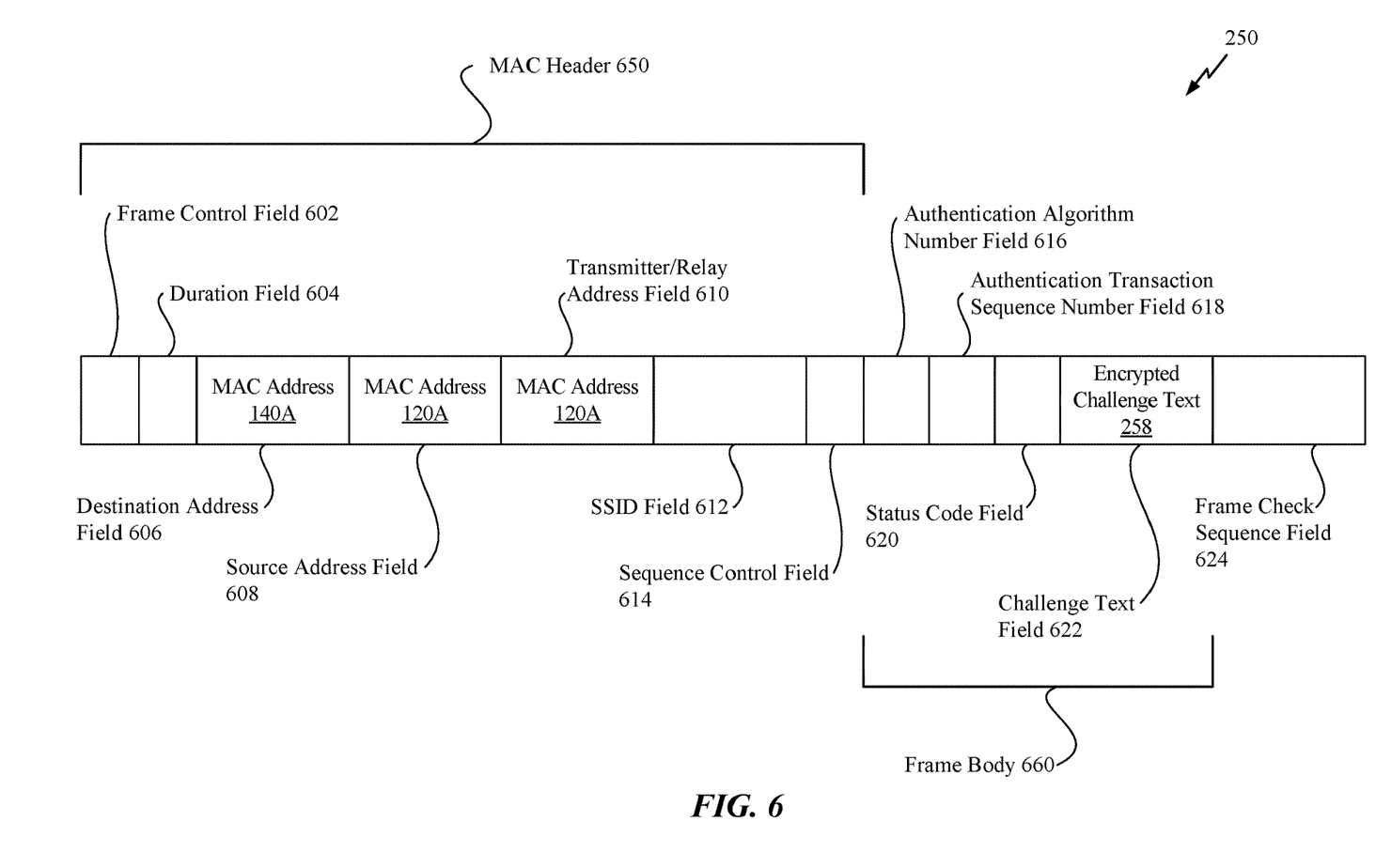
FIG. 6 is a diagram of another authentication request, according to the techniques described herein.

Referring to FIG. 6, an illustrative example of the authentication request 250 is shown. The authentication request 250 includes a MAC header 650 and a frame body 660. The MAC header 650 includes a frame control field 602, a duration field 604, a destination address field 606, a source address field 608, a transmitter address field 610 (e.g., a relay address field), a SSID field 612, and a sequence control field 614. The frame body 660 includes an authentication algorithm number field 616, an authentication transaction sequence number field 618, a status code field 620, and a challenge text field 622. The authentication request 250 also includes a frame check sequence field 624.

For the station 110 to send the authentication request 250 to the access point 140 on behalf of the station 120, the frame generator 228 is configured to populate the destination address field 606 in the authentication request 246 with the MAC address 140A of the access point 140. Populating the destination address field 606 with the MAC address 140 of the access point 140 results in transmission of the authentication request 250 to the access point 140.

Additionally, to send the authentication request 250 to the access point 140 on behalf of the station 120, the frame generator 228 is configured to populate the source address field 608 in the authentication request 250 and the transmitter address field 610 in the authentication request 250 with the MAC address 120A of the station 120. Populating the source and transmitter address fields 608, 610 with the MAC address 120A of the station 120 promotes the access point 140 to send an authentication message 192 to the station 120, as illustrated in FIG. 1.

The frame generator 228 is configured to populate the challenge text field 622 with the encrypted challenge text 258. As described above, once the authentication request 250 is received by the access point 140, the encrypted challenge text 258 is decrypted by the access point 140 using the security key 232 for verification. The other fields 402, 404, 412, 414, 416, 418, 420, 422, 424 can be populated according to a SKA method.

Referring back to FIG. 1, the access point 140 receives, from the station 110, the authentication request 250 having the encrypted challenge text 258. The access point 140 is configured to decrypt the encrypted challenge text 258 using the security key 232 to re-generate the challenge text 552 sent to the station 110. Upon successful regeneration of the challenge text 552, the access point 140 sends the authentication message 192 to the station 120 to enable the station 120 to join the wireless network 150. Thus, the station 110 permits and controls access of the station 120 to the wireless network 150 without having to disclose the security key 232 for the wireless network 150 to the station 120. For example, the station 110 uses the security key 232 to authenticate other approved stations (e.g., the station 120) with the access point 140 of the wireless network 150 without disclosing the security key 232.

According to another implementation, the frame generator 228 is configured to populate the transmitter address field 610 in the authentication request 250 with the MAC address 110A of the station 110 to promote the access point 140 to send the authentication message 192 to the station 110. In this implementation, the station 110 receives the authentication message 192 from the access point 140 and relays the authentication message 192 to the station 120 while in the ad hoc communication mode 236.

In other scenarios, the station 110 can inhibit another station from joining the wireless network 150. To illustrate, while operating in the ad hoc communication mode 236 during the particular time period, the wireless transceiver 208 can receive a request 182, from the station 130, to join the wireless network 150 in response to broadcasting the beacon frame 242, as shown in FIG. 1. The request 182 includes device information 256 associated with the station 130. The device information 256 can include an address of the station 130 (e.g., a MAC address of the station 130), capability information of the station 130, etc.

The processor 202 is configured to determine, based on the device information 256 associated with the station 130, whether the station 130 is an approved device. For example, the processor 202 can make a determination of whether to grant the station 130 access to the wireless network 120.

In a similar manner as described above, to determine whether the station 130 is an approved device, the prompt generator 226 can generate a prompt to verify whether the station 130 has permission to join the wireless network 150. According to another implementation, to determine whether the station 130 is an approved device, the processor 202 is configured to access the list of stations 260 that have previously been granted permission to join the wireless network 150. For purposes of description, assume that the station 130 is not an approved device.

In response to the determination that the station 130 is not an approved device, the frame generator 228 is configured to generate an exclusion frame 254 that includes the device information 256 associated with the station 130. The wireless transceiver 208 is configured to send the exclusion frame 254 to the access point 140, as shown in FIG. 1, and the access point 140 rejects authentication requests from the station 130 in response to receiving the exclusion frame 254.

It should be appreciated that the techniques described with respect to FIGS. 1-6 enable the station 110 to permit and control access to the wireless network 150 without having to disclose the security key 232 for the wireless network 150. For example, the station 110 uses the security key 232 to authenticate other approved stations (e.g., the station 120) with the access point 140 of the wireless network 150 without disclosing the security key 232 to the approved stations. The station 110 can also send messages to exclude unapproved stations (e.g., the station 130) from the wireless network 150. As a result, by performing the authentication on behalf of other stations and controlling access to the wireless network 150 without disclosing the security key 232, the likelihood that additional mobile devices will access the wireless network 150, with or without the user's permission, decreases. Thus, the wireless network 150 is less susceptible to network congestion and security threats.

Figure 7:
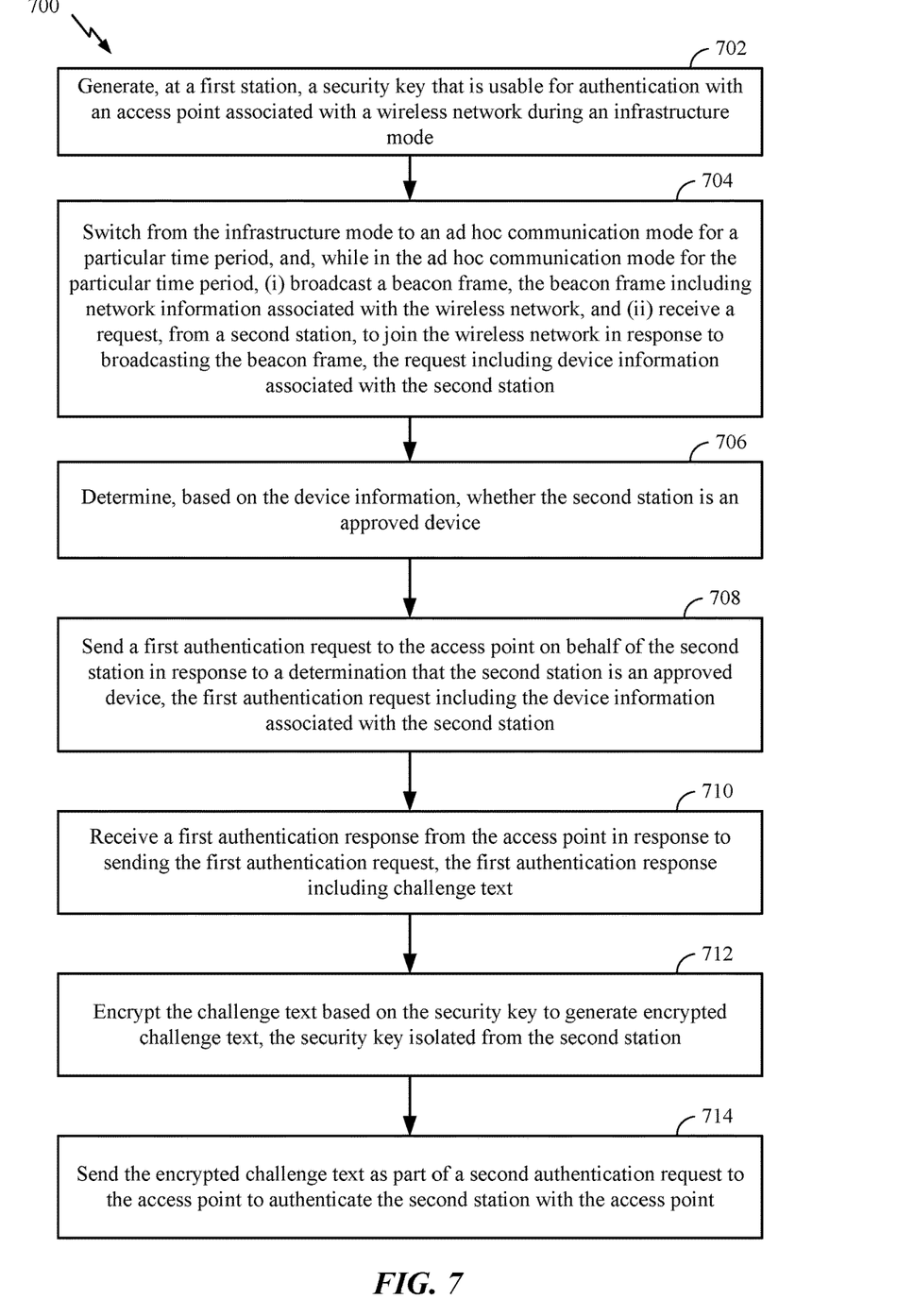
FIG. 7 illustrates a flowchart of a method of station authentication.

Referring to FIG. 7, a method 700 of station authentication is shown. The method 700 may be performed by the station 110 of FIGS. 1 and 2, as illustrative examples.

The method 700 includes generating, at a first station, a security key that is usable for authentication with an access point associated with a wireless network during an infrastructure mode, at 702. For example, referring to FIG. 2, the security key generator 220 generates the security key 232 that is usable for authentication with the access point 140 associated with the wireless network 150 during the infrastructure mode 234. According to one implementation of the method 700, the wireless network includes an IEEE 802.11 wireless network. According to one implementation of the method 700, the wireless network includes a WLAN.

The method 700 also includes switching from the infrastructure mode to an ad hoc communication mode for a particular time period, at 704. For example, referring to FIG. 2, the mode selector 222 switches the station 110 from the infrastructure mode 234 to the ad hoc communication mode 236 for the particular time period.

According to one implementation of the method 700, switching from the infrastructure mode to the ad hoc communication mode includes monitoring an amount of data transfer associated with the wireless network while operating in the infrastructure mode and switching from the infrastructure mode to the ad hoc communication mode in response to a determination that the amount of data transfer fails to satisfy a data transfer threshold. For example, referring to FIG. 2, the data transfer monitor 224 monitors the data transfer amount 238 associated with the wireless network 150 while operating in the infrastructure mode 234, and the mode selector 222 switches the station 110 from the infrastructure mode 234 to the ad hoc communication mode 236 in response to a determination that the data transfer amount 238 fails to satisfy the data transfer threshold.

According to another implementation of the method 700, switching from the infrastructure mode to the ad hoc communication mode is periodically initiated by the first station. For example, referring to FIG. 2, the mode selector 222 periodically switches from the infrastructure mode 234 to the ad hoc communication mode 236. A frequency at which the first station initiates a periodic switch from the infrastructure mode to the ad hoc communication mode can be dependent on a historical number of stations that have been authenticated with the access point.

According to another implementation of the method 700, switching from the infrastructure mode to the ad hoc communication mode is initiated by a user request. For example, referring to FIG. 2, the mode selector 222 switches from the infrastructure mode 234 to the ad hoc communication mode 236 in response to a user request.

While in the ad hoc communication mode for the particular time period, the method 700 includes (i) broadcasting a beacon frame and (ii) receiving a request, from a second station, to join the wireless network in response to broadcasting the beacon frame. The beacon frame includes network information associated with the wireless network, and the request includes device information associated with the second station. For example, referring to FIGS. 1 and 2, while operating in the ad hoc communication mode 236, the station 110 broadcasts (e.g., sends) the beacon frame 242 to the stations 120, 130 and receives the request 180, from the station 120, to join the wireless network 150 in response to broadcasting the beacon frame 242. The beacon frame 242 includes the network information 244 associated with the wireless network 150, and the request 180 includes the device information 248 associated with the station 120. According to one implementation of the method 700, the network information includes a service set identifier (SSID) of the wireless network and capability information of the access point. According to one implementation of the method 700, the device information associated with the second station includes an address of the second station and capability information of the second station.

The method 700 also includes determining, based on the device information, whether the second station is an approved device, at 706. For example, referring to FIGS. 2-3, the processor 202 determines, based on the device information 248 associated with the station 120, whether the station 120 is an approved device.

According to one implementation of the method 700, determining whether the second station is an approved device comprises generating, based on the device information associated with the second station, a prompt to verify whether the second station has permission to join the wireless network. For example, referring to FIG. 2, the prompt generator 226 generates the prompt 240, based on the device information 248, to verify whether the station 120 has permission to join the wireless network 150. According to the above-implementation, determining whether the second station is an approved device also includes displaying the prompt at the first station and receiving a user response to the prompt. For example, referring to FIGS. 2-3, the display controller 210 can display the prompt 240 at the interactive user display 212 (as shown in FIG. 3), and the processor 202 receives the user response (e.g., the selection of one of the options 302, 304). The second station (e.g. the station 120) is an approved device if the user response indicates that the second station has permission to join the wireless network 150. The second station is not an approved device if the user response indicates that the second station does not have permission to join the wireless network 150.

According to one implementation of the method 700, determining whether the second station is an approved device comprises accessing a list of stations that have previously been granted permission to join the wireless network. For example, referring to FIG. 2, the processor 202 accesses the list of stations 260 in the database 206. According to the above-implementation, determining whether the second station is an approved device also includes comparing the device information associated with the second station to device information associated with stations in the list of stations. For example, referring to FIG. 2, the processor 202 compares the device information 248 associated with the station 120 with the device information 248, 262 of stations in the list of stations 260. The second station (e.g., the station 120) is an approved device if the device information associated with the second station matches device information of a station in the list of stations, and the second station is not an approved device if the device information associated with the second station fails to match device information of a station in the list of stations.

The method 700 also includes sending a first authentication request to the access point on behalf of the second station in response to a determination that the second station is an approved device, at 708. The first authentication request includes the device information associated with the second station. For example, referring to FIGS. 1, 2, and 4, the wireless transceiver 208 sends the authentication request 246 to the access point 140 on behalf of station 120 in response to a determination the station 120 is an approved device.

According to one implementation, prior to sending the first authentication request to the access point, the method 700 includes determining an address of the second station based on the device information associated with the second station. For example, referring to FIG. 2, the processor 202 determines the MAC address 120A of the station 120 based on the device information 248 associated with the station 120. According to the above-implementation, the method 700 also includes populating a source address field in the first authentication request with the address of the second station to send the first authentication request on behalf of the second station. For example, referring to FIGS. 2 and 4, the frame generator 228 populates the source address field 408 in the authentication request 246 with the MAC address 120A of the station 120 to send the authentication request 246 on behalf of the station 120. According to the above-implementation, the method 700 also includes populating a transmitter address field in the first authentication request with an address of the first station to promote the access point to relay the first authentication response to the second station by way of the first station. For example, referring to FIGS. 2 and 4, the frame generator 228 populates the transmitter address field 410 in the authentication request 246 with the MAC address 110A of the station 110 to promote the access point 140 to relay the authentication response 190 to the station 120 by way of the station 110. It should be understood that a "relay" from station to station would be performed when switching to the ad hoc communication mode 236 as opposed to during the infrastructure mode 234 where messages are communicated with the access point 140.

The method 700 also includes receiving a first authentication response from the access point in response to sending the first authentication request, at 710. The first authentication response includes challenge text. For example, referring to FIGS. 1 and 5, the station 110 receives the authentication response 190 from the access point 140 in response to sending the authentication request 246. The authentication response 190 includes the challenge text 552. According to one implementation of the method 700, a destination address of the first authentication response is the address of the first station in response to populating the transmitter address field in the first authentication request with the address of the first station. For example, referring to FIG. 5, the destination address field 506 includes the MAC address 110A of the station 110A. The method 700 can also include bypassing the relay of the first authentication response to the second station after receiving the first authentication response to isolate the second station from the challenge text. For example, referring to FIG. 1, the station 110 bypasses relaying the authentication response 190 to the station 120 while in the ad hoc communication mode 236 after receiving the authentication response 190 to isolate the station 120 from the challenge text 552.

The method 700 also includes encrypting the challenge text based on the security key to generate encrypted challenge text, at 712. The security key is isolated from the second station. For example, referring to FIG. 2, the encryption unit 230 encrypts the challenge text 552 based on the security key 232 to generate the encrypted challenge text 258.

The method 700 also includes sending the encrypted challenge text as part of a second authentication request to the access point to authenticate the second station with the access point, at 714. For example, referring to FIGS. 1 and 6, the station 110 sends the encrypted challenge text 258 as part of the authentication request 250 to the access point 140 to authenticate the station 120 with the access point 140.

According to one implementation, prior to sending the second authentication request to the access point, the method 700 includes populating a source address field in the second authentication request and a transmitter address field in the second authentication request with the address of the second station to promote the access point to send an authentication message to the second station. For example, referring to FIGS. 2 and 6, the frame generator 228 populates the source address field 608 in the authentication request 250 and the transmitter address field 610 in the authentication request 250 with the MAC address 120A of the station 120 to promote the access point 140 to send the authentication message 192 to the station 120.

According to one implementation, prior to sending the second authentication request to the access point, the method 700 includes populating a transmitter address field in the second authentication request with the address of the first station to promote the access point to send an authentication message to the first station. According to this implementation, the method 700 can also include receiving the authentication message from the access point and relaying the authentication message to the second station while in the ad hoc communication mode.

According to one implementation, the method 700 also includes receiving a second request, from a third station, to join the wireless network in response to broadcasting the beacon frame. The second request includes device information associated with the third station. For example, referring to FIGS. 1 and 2, the station 110 receives the request 182, from the station 130, to join the wireless network 150 in response to broadcasting the beacon frame 242. The request 182 includes the device information 256 associated with the station 130. According to the above implementation, the method 700 includes determining, based on the device information associated with the third station, whether the third station is an approved device. For example, referring to FIG. 2, the processor 202 determines, based on the device information 256, whether the station 130 is an approved device. According to the above-implementation, the method 700 also includes sending an exclusion frame to the access point in response to a determination that the third station is not an approved device. The exclusion frame includes the device information associated with the third station, and the access point rejects authentication requests from the third station in response to receiving the exclusion frame. For example, referring to FIGS. 1 and 2, the station 110 sends the exclusion frame 254 to the access point 140 in response to a determination that the station 130 is not an approved device. The exclusion frame 254 includes the device information 256 associated with the station 130, and the access point 140 rejects authentication requests from the station 130 in response to receiving the exclusion frame 254. Thus, in response to sending the exclusion frame 254, a MAC address 130A of the station 130 is not recognized as a viable address to perform direct authentication.

According to one implementation, the method 700 includes establishing an ad hoc communication network prior to switching from the infrastructure mode to the ad hoc communication mode. The second station and the third station are included in the ad hoc communication network. For example, the station 110 can establish the ad hoc communication network prior to switching from the infrastructure mode 234 to the ad hoc communication mode 236. The stations 120, 130 can be included in the ad hoc communication network.

The method 700 of FIG. 7 enables the station 110 to permit and control access to the wireless network 150 without having to disclose the security key 232 for the wireless network 150. For example, the station 110 uses the security key 232 to authenticate other approved stations (e.g., the station 120) with the access point 140 of the wireless network 150 without disclosing the security key 232 to the approved stations. The station 110 can also send messages to exclude unapproved stations (e.g., the station 130) from the wireless network 150. As a result, by performing the authentication on behalf of other stations and controlling access to the wireless network 150 without disclosing the security key 232, the likelihood that additional mobile devices will access the wireless network 150, with or without the user's permission, decreases. Thus, the wireless network 150 is less susceptible to network congestion and security threats.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method of station authentication, the method comprising:
   generating, at a first station, a security key that is usable for authentication with an access point associated with a wireless network during an infrastructure mode;
   switching from the infrastructure mode to an ad hoc communication mode for a particular time period, and, while in the ad hoc communication mode for the particular time period:
      broadcasting a beacon frame, the beacon frame including network information associated with the wireless network; and
      receiving a request, from a second station, to join the wireless network in response to broadcasting the beacon frame, the request including device information associated with the second station;
   determining, based on the device information, whether the second station is an approved device;
   sending a first authentication request to the access point on behalf of the second station in response to a determination that the second station is an approved device, the first authentication request including the device information associated with the second station;
   receiving a first authentication response from the access point in response to sending the first authentication request, the first authentication response including challenge text;
   encrypting the challenge text based on the security key to generate encrypted challenge text, the security key isolated from the second station; and
   sending the encrypted challenge text as part of a second authentication request to the access point to authenticate the second station with the access point.

2. The method of claim 1, wherein, prior to sending the first authentication request to the access point, the method comprises:
   determining an address of the second station based on the device information associated with the second station;
   populating a source address field in the first authentication request with the address of the second station to send the first authentication request on behalf of the second station; and
   populating a transmitter address field in the first authentication request with an address of the first station to promote the access point to relay the first authentication response to the second station by way of the first station.

3. The method of claim 2, wherein a destination address of the first authentication response is the address of the first station in response to populating the transmitter address field in the first authentication request with the address of the first station, and further comprising:
   bypassing the relay of the first authentication response to the second station after receiving the first authentication response to isolate the second station from the challenge text.

4. The method of claim 3, wherein, prior to sending the second authentication request to the access point, the method comprises:
   populating a source address field in the second authentication request and a transmitter address field in the second authentication request with the address of the second station to promote the access point to send an authentication message to the second station.

5. The method of claim 3, wherein, prior to sending the second authentication request to the access point, the method comprises:
   populating a transmitter address field in the second authentication request with the address of the first station to promote the access point to send an authentication message to the first station;
   receiving the authentication message from the access point; and
   relaying the authentication message to the second station while in the ad hoc communication mode.

6. The method of claim 1, further comprising:
   receiving a second request, from a third station, to join the wireless network in response to broadcasting the beacon frame, the second request including device information associated with the third station;
   determining, based on the device information associated with the third station, whether the third station is an approved device; and
   sending an exclusion frame to the access point in response to a determination that the third station is not an approved device, the exclusion frame including the device information associated with the third station, wherein the access point rejects authentication requests from the third station in response to receiving the exclusion frame.

7. The method of claim 6, further comprising establishing an ad hoc communication network prior to switching from the infrastructure mode to the ad hoc communication mode, wherein the second station and the third station are included in the ad hoc communication network.

8. The method of claim 1, wherein switching from the infrastructure mode to the ad hoc communication mode comprises:
   monitoring an amount of data transfer associated with the wireless network while operating in the infrastructure mode; and
   switching from the infrastructure mode to the ad hoc communication mode in response to a determination that the amount of data transfer fails to satisfy a data transfer threshold.

9. The method of claim 1, wherein switching from the infrastructure mode to the ad hoc communication mode is periodically initiated by the first station.

10. The method of claim 9, wherein a frequency at which the first station initiates a periodic switch from the infrastructure mode to the ad hoc communication mode is dependent on a historical number of stations that have been authenticated with the access point.

11. The method of claim 1, wherein switching from the infrastructure mode to the ad hoc communication mode is initiated by a user request.

12. The method of claim 1, wherein determining whether the second station is an approved device comprises:
   generating, based on the device information associated with the second station, a prompt to verify whether the second station has permission to join the wireless network;
   displaying the prompt at the first station; and
   receiving a user response to the prompt, wherein the second station is an approved device if the user response indicates that the second station has permission to join the wireless network, and wherein the second station is not an approved device if the user response indicates that the second station does not have permission to join the wireless network.

13. The method of claim 1, wherein determining whether the second station is an approved device comprises:
    accessing a list of stations that have previously been granted permission to join the wireless network;
    comparing the device information associated with the second station to device information associated with stations in the list of stations, wherein the second station is an approved device if the device information associated with the second station matches device information of a station in the list of stations, and wherein the second station is not an approved device if the device information associated with the second station fails to match device information of a station in the list of stations.

14. The method of claim 1, wherein the wireless network comprises an Institute of Electrical and Electronics Engineers (IEEE) 802.11 wireless network.

15. The method of claim 1, wherein the wireless network comprises a wireless local area network (WLAN).

16. The method of claim 1, wherein the network information includes a service set identifier (SSID) of the wireless network and capability information of the access point, and wherein the device information associated with the second station includes an address of the second station and capability information of the second station.

17. A station comprising:
    a memory;
    a processor coupled to the memory, the processor configured to:
        generate a security key that is usable for authentication with an access point associated with a wireless network during an infrastructure mode; and
        initiate a switch from the infrastructure mode to an ad hoc communication mode for a particular time period;
    a transceiver coupled to the processor, the transceiver configured to:
        while in the ad hoc communication mode for the particular time period:
            broadcast a beacon frame, the beacon frame including network information associated with the wireless network; and
            receive a request, from a second station, to join the wireless network in response to broadcasting the beacon frame, the request including device information associated with the second station,
    wherein the processor is further configured to determine, based on the device information, whether the second station is an approved device,
    wherein the transceiver is further configured to:
        send a first authentication request to the access point on behalf of the second station in response to a determination that the second station is an approved device, the first authentication request including the device information associated with the second station; and
        receive a first authentication response from the access point in response to sending the first authentication request, the first authentication response including challenge text;
    wherein the processor is further configured to encrypt the challenge text based on the security key to generate encrypted challenge text, the security key isolated from the second station, and
    wherein the transceiver is further configured to send the encrypted challenge text as part of a second authentication request to the access point to authenticate the second station with the access point.

18. The station of claim 17, wherein, prior to sending the first authentication request to the access point, the processor is configured to:
    determine an address of the second station based on the device information associated with the second station;
    populate a source address field in the first authentication request with the address of the second station to send the first authentication request on behalf of the second station; and
    populate a transmitter address field in the first authentication request with an address of the station to promote the access point to relay the first authentication response to the second station by way of the station.

19. A non-transitory computer-readable medium comprising instructions for station authentication, the instructions, when executed by a processor in a station, cause the processor to perform operations comprising:
    generating a security key that is usable for authentication with an access point associated with a wireless network during an infrastructure mode;
    initiating a switch from the infrastructure mode to an ad hoc communication mode for a particular time period, and, while in the ad hoc communication mode for the particular time period:
        initiating a broadcast of a beacon frame, the beacon frame including network information associated with the wireless network; and
        processing a received request, from a second station, to join the wireless network in response to broadcasting the beacon frame, the request including device information associated with the second station;
    determining, based on the device information, whether the second station is an approved device;
    initiating transmission of a first authentication request to the access point on behalf of the second station in response to a determination that the second station is an approved device, the first authentication request including the device information associated with the second station;
    processing a received first authentication response from the access point in response to sending the first authentication request, the first authentication response including challenge text;
    encrypting the challenge text based on the security key to generate encrypted challenge text, the security key isolated from the second station; and
    initiating transmission of the encrypted challenge text as part of a second authentication request to the access point to authenticate the second station with the access point.

20. The non-transitory computer-readable medium of claim 19, wherein, prior to sending the first authentication request to the access point, the operations comprise:
    determining an address of the second station based on the device information associated with the second station;
    populating a source address field in the first authentication request with the address of the second station to send the first authentication request on behalf of the second station; and
    populating a transmitter address field in the first authentication request with an address of the station to promote the access point to relay the first authentication response to the second station by way of the station.

* * * * *